United States Patent
Nagasaka

(10) Patent No.: US 7,053,577 B2
(45) Date of Patent: May 30, 2006

(54) ROBOT AND MOTION CONTROL METHOD OF ROBOT

(75) Inventor: Kenichiro Nagasaka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/014,050

(22) Filed: Dec. 16, 2004

(65) Prior Publication Data
US 2005/0151497 A1   Jul. 14, 2005

(30) Foreign Application Priority Data
Dec. 17, 2003   (JP) ............................. 2003-418988

(51) Int. Cl.
*B25J 5/00*   (2006.01)
(52) U.S. Cl. ................. 318/568.12; 700/245; 700/247; 901/1; 180/8.6
(58) Field of Classification Search ........... 318/568.12; 700/245, 247; 180/8.6; 901/1
See application file for complete search history.

(56) References Cited

U.S. PATENT DOCUMENTS

| | | | | |
|---|---|---|---|---|
| 5,255,753 A * | 10/1993 | Nishikawa et al. | ........... | 180/8.6 |
| 5,432,417 A * | 7/1995 | Takenaka et al. | ...... | 318/568.12 |
| 6,438,454 B1 * | 8/2002 | Kuroki | ....................... | 700/245 |
| 6,493,606 B1 * | 12/2002 | Saijo et al. | .................. | 700/245 |
| 6,534,943 B1 * | 3/2003 | Hornby et al. | ......... | 318/568.12 |
| 6,583,595 B1 * | 6/2003 | Hattori et al. | ............... | 318/567 |
| 6,802,382 B1 * | 10/2004 | Hattori et al. | ................ | 180/8.6 |
| 6,832,132 B1 * | 12/2004 | Ishida et al. | ................. | 700/245 |
| 6,917,175 B1 * | 7/2005 | Hattori et al. | .............. | 318/567 |
| 2004/0172165 A1 * | 9/2004 | Iribe et al. | ................... | 700/245 |
| 2004/0206164 A1 * | 10/2004 | Kawai et al. | .............. | 73/65.07 |
| 2005/0021176 A1 * | 1/2005 | Takenaka et al. | ........... | 700/245 |
| 2005/0051368 A1 * | 3/2005 | Takenaka et al. | ............ | 180/8.6 |
| 2005/0055131 A1 * | 3/2005 | Mikami et al. | .............. | 700/245 |
| 2005/0055133 A1 * | 3/2005 | Takenaka et al. | ........... | 700/245 |
| 2005/0065646 A1 * | 3/2005 | Takenaka et al. | ........... | 700/245 |
| 2005/0115747 A1 * | 6/2005 | Takenaka et al. | ............ | 180/8.1 |
| 2005/0154492 A1 * | 7/2005 | Takenaka et al. | ........... | 700/245 |
| 2005/0240306 A1 * | 10/2005 | Takenaka et al. | ........... | 700/245 |

* cited by examiner

*Primary Examiner*—Rita Leykin
(74) *Attorney, Agent, or Firm*—Frommer Lawrence & Haug LLP; William S. Frommer; Thomas F. Presson

(57) ABSTRACT

When the sole of the foot of one of the leg sections of the robot leaves or touch the floor, the angular velocity of the joint angle θ of each of the joints of the leg section of the robot becomes infinitely large and excessive loads are applied to the respective joints if the leg section is stretched out or the robot takes some other peculiar attitude. Therefore, when the sole of the foot section of a leg section leaves or touches the floor, the constraining conditions are defined for the foot section relative to the floor surface that the foot section touches according to the degree of operability of the leg section in order to reduce the loads that are applied to the respective joints of the leg section. Additionally, the attitude of the foot section is determined so as to minimize or reduce the potential energy attributable to a minute quantity of positional changes of the joints of the leg section.

4 Claims, 15 Drawing Sheets

ROBOT AND MOTION CONTROL METHOD OF ROBOT

BACKGROUND OF THE INVENTION

1. Field of the Invention

This invention relates to a robot having at least a plurality of movable legs and a method of controlling the motion of such a robot. More particularly, the present invention relates to a robot adapted to perform not only motions having only floor-touching periods such as walking but also those having both floor-touching periods and non-floor-touching periods such as running and jumping in an intermingled manner and also to a method of controlling the motion of such a robot.

Still more particularly, the present invention relates to a robot adapted to alleviate the load it is subjected to when one of the legs leaves or touches the floor in a running or jumping motion and also to a method of controlling the motion of such a robot. Still more particularly, the present invention relates to a robot adapted to alleviate the load it is subjected to when one of the legs leaves or touches the floor in a running or jumping motion by controlling the sole of the foot located at the front end of the leg and also to a method of controlling the motion of such a robot.

This application claims priority of Japanese Patent Application No. 2003-418988, filed on Dec. 17, 2003, the entirety of which is incorporated by reference herein.

2. Description of Related Art

A machine device adapted to move in a manner resembling to motions of human being by means of electric and/or magnetic operations is referred to as "robot". It is the that the word "robot" derives from a Slavic word "ROBOTA (slave machine)". In Japan, robots started to become popular in the later 1960s, although many of them were industrial robots such as manipulators and transfer robots installed for the purpose of automating productive operations of factories and saving man power.

Research and development efforts have been paid in recent years on mobile robots that are equipped with movable legs. Expectations are high for such mobile robots in practical applications. Two-legged mobile robots modeled after human motions are referred to humanoid robots.

While two-legged robots that are based on erect bipedalism are accompanied by problems of instability and difficulty of attitude control and walk control if compared with crawler type robots and four-legged or six-legged robots, they provide advantages including that they can adapt themselves to walking surfaces with obstacles and undulations on the way such as unleveled ground, and discontinued walking surfaces such as staircases and ladders to be stepped up and down so that they can move in a flexible manner.

Numerous techniques have already been proposed with regard to attitude control and stable walking of two-legged mobile robots. Stable "walking" as used herein is defined as "moving by using legs without stumbling and falling". It is very important to perform attitude stabilizing for control preventing robots from stumbling and falling. When the body of a robot stumbles and falls, it means that the ongoing operation of the robot is suspended and that considerable power and time need to be spent for the robot to stand up from the falling state and resume its operation. Additionally, when the robot stumbles and falls, there arises a risk that the robot itself and/or the object that the falling robot collides with can be fatally damaged.

Many proposals relating to attitude stabilizing control and prevention of falling during a walk of legged mobile robots use a ZMP (zero moment point) as norm for judging the stability of walking of a two-legged mobile robot. The norm for judging the stability of walking using a ZMP is based on d'Alembert's principle that the gravity and the inertial force exerted by a walking system on the floor surface and their moments are balanced respectively by the reaction force of the floor exerted by the floor surface to the walking system and its moment. As a consequence of reasoning in the framework of dynamics, there exists a point where both the pitch axis moment and the roll axis moment are equal to zero, or a ZMP, on one of the sides of the supporting polygon (or the ZMP-stable region) formed by the contact points of the soles relative to the floor surface or in the inside thereof (see, inter alia, Non-Patent Reference Document 1).

In short, the ZMP norm provides that "a robot can stably walk without falling (as a result of a rotary motion of the machine body) if a ZMP is found inside the supporting polygon formed by the foot touching the floor and the floor surface and a force is exerted by the robot in a direction of pressing the floor surface".

Generation of a bipedal walk pattern on the basis of the ZMP norm provides advantages including that it is possible to define a sole landing point in advance and that it is easy to consider kinetic restricting conditions for the tips of the feet corresponding to the profile of the floor surface. Additionally, using a ZMP for the norm for judging stability means that it is not force but a trajectory of motion that is handled as target for controlling the motion and hence it is technically more feasible.

Meanwhile, the legged mobile robots that have been developed so far are mostly designed to "walk" by making the robot constantly touch the floor surface at least at one of the legs thereof. In ordinary situations, walking is an optimal moving mode in which legged mobile robots can move safely and efficiently because it does not apply any excessive load to the mechanical and electric systems of the robot.

On the other hand, there may be situations that a legged mobile robot cannot cope with simply by means of its walking feature. In such a situation, the robot may be in a non-floor-touching state and hence cannot get any reaction force from the ground. When a legged mobile robot moves on the ground in a gravity-bound environment, it cannot be in a non-floor-touching state continuously for a long period of time, although there may be numerous situations where the robot is brought into a non-floor-touching state intermittently for a short period of time. For example, the robot may have to jump over a crevice of the ground, jump down from a step, run in order to move faster or change its stance by jumping up in order to maintain its bodily balance.

Although not many, there are some precursory researches that deal with balance control of legged mobile robots in a non-floor-touching state (see, inter alia, Non-Patent Documents 2 and 3). However, the outcome of those researches has not been actually utilized for the control systems of practical legged mobile robots.

(1) The degree of mechanical design freedom is limited to a large extent because the use of massless legs is assumed.
(2) Dynamics of transitions from walking to a halt have not been discussed sufficiently because only continuous jumping is assumed.
(3) It is difficult to define and impose geometric constraining conditions for the trajectories of the toes of the legs of the robot.

Techniques for computationally determining motion patterns of legged mobile robots in a situation where floor-touching states and non-floor-touching states coexist (see, inter alia, Non-Patent Document 4) have been proposed as extension of the ZMP norm. However, the technique proposed in the cited non-patent document entails a large computational load because it uses convergence operations to solve non-linear equations so that motion patterns have to be computed in advance on an off-line basis. In other words, it cannot generate motion patterns of coexistence of floor-touching periods and non-floor-touching periods for walking, running, jumping and other motions on a real time basis.

For walk control, the technique of computing motion patterns on the basis of the ZMP norm provides a basic control means that is highly promising for legged mobile robots today. The highest advantage of applying a ZMP to the norm for stability judgment of the machine body of a robot is its practicality including that it is easy to define and impose geometric constraining conditions for the trajectories of the toes of the legs of the robot and that it can be applied to broadly different machine models. For example, there are reports telling that techniques for generating walking patterns on a real time basis have been established so as make it possible for the robot to generate a stable motion pattern on board while walking or otherwise in motion (see, inter alia, Non-Patent Document 5).

On the other hand, for motions including non-floor-touching periods such as running and jumping motions, no practical control means has been proposed to date as pointed out above.

For instance, when a robot walks, jump or takes some other action, the load applied to each of the joints of the ankles and the other parts of the legs is enormous at the instant when the supporting leg leaves the floor or when the idle leg touches the floor. There is an idea of providing the legs of a robot with a buffering material or some other load absorption mechanism.

However, according to the concept of target ZMP follow-up control (as described above) that is in the mainstream of control method for bipedal robots, the soles of the robot are assumed to be formed by a rigid body and it is thought that the falling moment can be supported when a ZMP is found within the supporting polygon formed by the floor-touching points of the supporting leg and the floor. In other words, the use of a rigid body is desired for the soles. This contradicts the idea of providing the legs of a robot with a buffering material or some other load absorption mechanism.

[Non-Patent Document 1] Miomir Vukobratovic, "LEGGED LOCOMOTION ROBOTS" (Ichiro Kato et al., "Walking Robots and Artificial Legs", (Nikkan Kogyo Shimbun, Ltd.)).

[Non-Patent Document 2] Kiyotoshi Matsuoka, "A Repetitive Jumping Model, Biomechanism 5" (University of Tokyo Press, 1985, pp. 4501–4509).

[Non-Patent Document 3] Marc H. Raibert et al., "Experiments in Balance with a 3D one-Legged Hopping Machine" (The International Journal of Robotics Research), 1984, Vol. 3, No. 2, pp. 75–92).

[Non-Patent Document 4] Kenichiro Nagasaka, "Generation of Whole Body Motions of a Humanoid Robot, Using Dynamics Filters" (1999, The Doctorial Dissertation, Information Engineering, Faculty of Engineering, The University of Tokyo).

[Patent Document 5] Letter of Specification, Japanese Patent Application Laid-Open Publication No. 2002-288745.

SUMMARY OF THE INVENTION

In view of the above identified circumstances, it is therefore an object of the present invention to provide an excellent robot that can perform not only motions having only floor-touching periods such as walking but also those having both floor-touching periods and non-floor-touching periods such as running and jumping in an intermingled manner and also a method of controlling the motion of such a robot.

Another object of the present invention is to provide an excellent robot that can alleviate the load it is subjected to when one of the legs leaves or touches the floor in a running or jumping motion and also a method of controlling the motion of such a robot.

Still another object of the present invention is to provide an excellent robot that can alleviate the load it is subjected to when one of the legs leaves or touches the floor in a running or jumping motion by controlling the sole of the foot located at the front end of the leg and also a method of controlling the motion of such a robot.

In the first aspect of the present invention, the above objects are achieved by providing a robot having leg sections provided with foot sections, the robot comprising: a drive means for driving the leg sections; a control means for control the drive means; a degree of operability computing means for computing the degree of operability of each of the leg sections; and a constraining-condition defining means for defining the constraining conditions of the foot sections relative to a floor surface for touching so as to maximize or increase the degree of operability when the robot moves by driving the leg sections; the control means being adapted to control the operation of driving the leg sections under the constraining conditions of the foot section relative to the floor surface for touching.

In the second aspect of the present invention, there is provided a robot having leg sections provided with soles and joint sections, the robot comprising: a drive means for driving the leg sections; a control means for controlling the drive means; and an energy computing means for computing the potential energy attributable to a minute quantity of positional changes of the joint sections that arise when the robot moves by driving the leg sections; the control means being adapted to control the soles so as to minimize or reduce the potential energy.

In the third aspect of the present invention, there is provided a robot having a plurality of leg sections, the robot comprising: a drive means for driving the leg sections; a control means for controlling the drive means; a ZMP trajectory planning means for planning the ZMP trajectory when the robot moves by driving the leg sections; a state quantity computing means for computing the inclined state quantity of the robot; a modified ZMP trajectory computing means for computing the modified ZMP trajectory in order to reduce the computed inclined state quantity; a trajectory deviation computing means for computing the deviation between the ZMP trajectory planned by the ZMP trajectory planning means and the modified ZMP trajectory computed by the modified ZMP trajectory computing means; and a step deciding means for deciding the next step of the leg sections according to the deviation of the ZMP trajectory.

Thus, a robot according to the invention has leg sections provided with foot sections and can realize legged locomotion including not only motions having only floor-touching periods such as walking but also those having both floor-touching periods and non-floor-touching periods such as running and jumping. Then, there arises a problem that the load applied to each of the joints of the ankles and the other parts of the legs is enormous at the instant when the supporting leg section leaves the floor or when the idle leg section touches the floor for the robot that is performing a running motion or a jumping motion.

The requirements for excessive load that each of the leg joints of a robot has to meet when the idle leg section touches the floor can be alleviated by providing the leg sections of the robot with a buffering material or some other load absorption mechanism. However, the use of target ZMP follow-up control is contradictory to the use of a load absorption mechanism because it is assumed for target ZMP follow-up control that the soles of a robot are formed by a rigid material and the robot is prevented from falling when a ZMP is found within the supporting polygon formed by the contact points of the sole of the supporting leg section and the floor surface.

When the sole of the foot of one of the leg sections of the robot leaves or touch the floor, the angular velocity of the joint angle θ of each of the joints of the leg section of the robot becomes infinitely large and excessive loads are applied to the respective joints if the leg section is stretched out or the robot takes some other peculiar attitude. Therefore, in the first aspect of the present invention, a concept of degree of operability is introduced as an index for indicating the closeness to a peculiar attitude of the robot. While such a peculiar attitude may be avoided by utilizing the redundancy of the degree of freedom, the redundancy is discussed here in terms of constraining conditions of the foot section of the leg section that touches the floor surface. In other words, when the sole of the foot section of a leg section leaves or touches the floor, the constraining conditions are defined for the foot section relative to the floor surface that the foot section touches according to the degree of operability of the leg section in order to reduce the loads that are applied to the respective joints of the leg section.

For example, when the rear leg section that is on the floor is about to leave the floor for advancing/jumping, the loads to the respective joints of the leg section are is alleviated if the entire foot section does not leave the floor simultaneously but the toe leaves the floor last because then the leg section can avoid a peculiar attitude and hence the degree of operability rises.

When, on the other hand, the fore leg section that is held idle is about to be moved forward to touch the floor, the loads to the respective joints of the leg section are alleviated if the heel touches the floor first because then the leg section can avoid a peculiar attitude and hence the degree of operability rises.

In the second aspect of the invention, after defining the constraining conditions for the foot section of a leg section that are about to leave or touch the floor relative to the floor surface according to the degree of operability, the attitude of the foot section (or the angle formed by the sole and the floor surface) is determined. More specifically, at this time, the attitude of the foot section is determined so as to minimize or reduce the potential energy attributable to a minute quantity of positional changes of the joints of the leg section in order to reduce the loads to the respective joints of the leg section.

Thus, when the constraining conditions of the foot section of a leg section that is about to touch the floor are defined and the angle formed by the sole and the floor surface is determined by the feature of controlling the motion of the leg section according to the first and second aspects of the invention, typically the foot section is made to take an attitude that remarkably reduces the area of touching the floor surface. For example, the foot section is made to touch the floor only at the toe.

When the leg touches the floor at the entire sole and the ZMP has a relatively large area, it is possible to maintain the attitude stability by manipulating the acting point of the reaction force of the floor by means of the entire supporting polygon. When, to the contrary, the leg touches the floor only at the toe (or at the heel), it is not possible to manipulate the acting point of the reaction force of the floor relative to the sole so that there may arise a problem that the stumbling attitude cannot be righted.

Therefore, in the third aspect of the invention, the quantity of inclination of the robot (distortion of the trajectory of the center of gravity) is observed during a leg motion such as running or jumping and a modified ZMP trajectory is computed so as to reduce the quantity of inclination. Then, the next step is determined according to the deviation of the modified ZMP trajectory from the original ZMP trajectory.

Thus, the present invention provides an excellent robot that is adapted to perform not only motions having only floor-touching periods such as walking but also those having both floor-touching periods and non-floor-touching periods such as running and jumping in an intermingled manner and also a method of controlling the motion of such a robot.

Additionally, the present invention provides an excellent robot adapted to alleviate the load it is subjected to when one of the legs leaves or touches the floor in a running or jumping motion and also a method of controlling the motion of such a robot.

Still additionally, the present invention provides an excellent robot adapted to alleviate the load it is subjected to when one of the legs leaves or touches the floor in a running or jumping motion by controlling the sole of the foot located at the front end of the leg and also a method of controlling the motion of such a robot.

Other objects, features and advantages of the present invention will become apparent from the following detailed description made by referring to the accompanying drawings that illustrate preferred embodiments of the invention.

DETAILED DESCRIPTION OF THE PREFERRED EMBODIMENTS

Now, the present invention will be described in greater detail by referring to the accompanying drawings that illustrate preferred embodiments of the invention.

Figure 1:
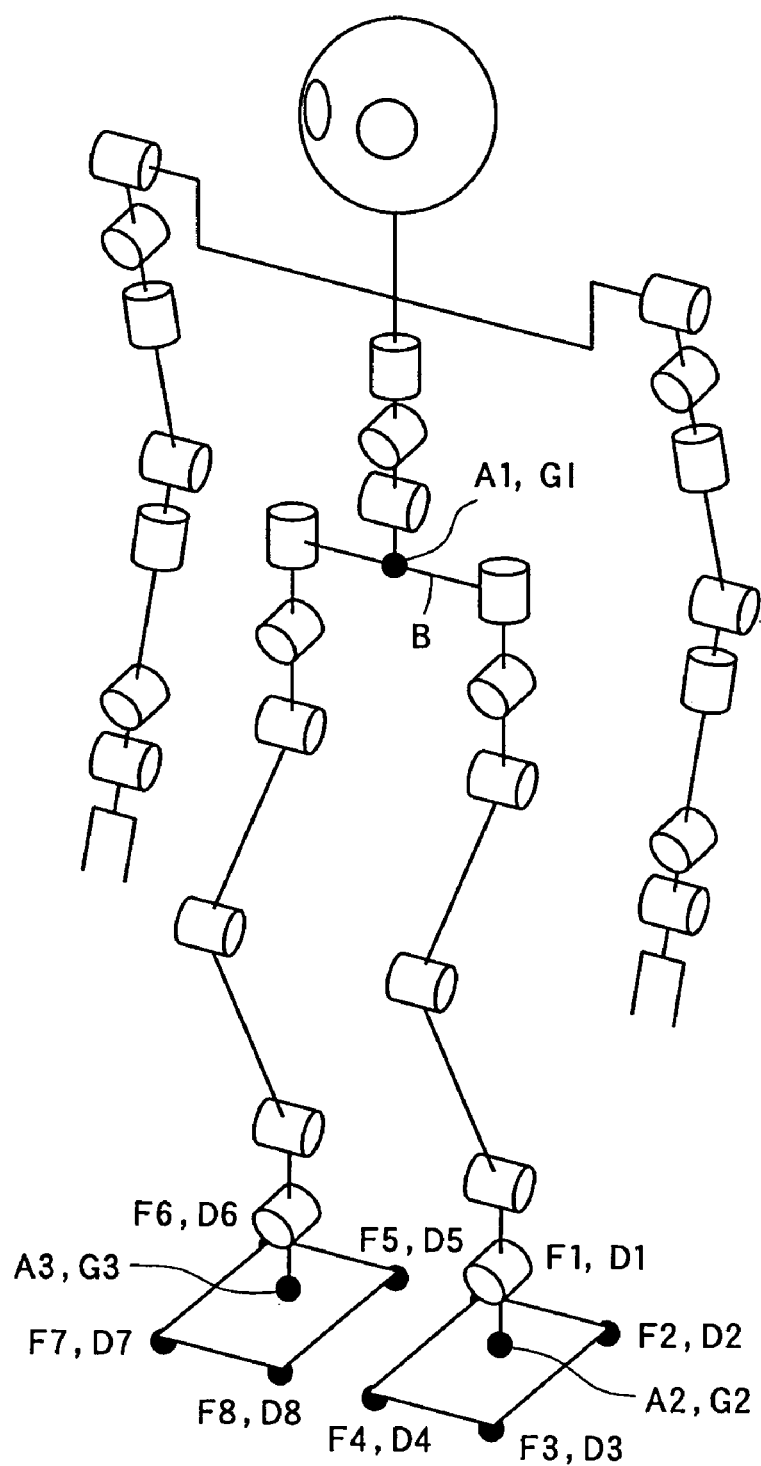
FIG. 1 is a schematic illustration of the degrees of freedom of the joints of an embodiment of legged mobile robot according to the invention.

FIG. 1 is a schematic illustration of the degrees of freedom of the joints of an embodiment of legged mobile robot according to the invention.

The robot illustrated in FIG. 1 comprises a base body to which four limbs are fitted. The four limbs include left and right arm sections having seven degrees of freedom of a shoulder joint pitch axis, a shoulder joint roll axis, an upper arm yaw axis, an elbow joint pitch axis, a forearm yaw axis, a wrist roll axis and a wrist pitch axis and left and right leg sections having six degrees of freedom of a hip joint yaw axis, a hip joint roll axis, a hip joint pitch axis, a knee pitch axis, an ankle pitch axis and an ankle roll axis.

The expression of "base body" as used herein refers to a part of the robot that maximizes the operable mass on the robot and that is the object of control. In this embodiment, it is so defined that the operable mass maximized near the pelvis for lining the left and right hip joints. The operable mass as used herein refers to the mass of the members that can be moved at a same time. The member where the operable mass is maximal is the movable member of the robot that shows the largest mass, for example. Thus, the member showing the largest mass that is not movable is not the member where the operable mass is maximal.

In the instance illustrated in FIG. 1, the pelvis B1 that links the left and right hip joints corresponds to the base body link. The upper body is coupled to the base body link B1 by way of the hip joint having three degrees of freedom (roll, pitch, yaw) along with two lower limbs having six degrees of freedom.

In reality, the degrees of freedom of each joint are realized by actuators/motors. Small AC servo actuators of a gear-direct-coupling type, where the servo control system of each actuator is realized as one-chip and contained in the corresponding motor unit, are mounted on the robot. AC servo actuator of this type is disclosed in Japanese Patent Application Laid-Open Publication No.2000-299970(Letter of Specification, Japanese Patent Application Laid-Open Publication No. 11-33386).

An acceleration sensor A1 and a gyro G1 are mounted at the pelvis section of the machine body. Four 1-axis load cells (F1 through F8) for detecting the reaction force in a direction perpendicular to the sole surface and infra-red distance sensors (D1 through D8) for measuring the distance from the sole to the floor are arranged at the four corners of the soles of the robot. Additionally, acceleration sensors (A2, A3) and gyros (G2, G3) are fitted to the centers of the left and right soles.

Assume here that the robot has mass m and the center of gravity in the inertia coordinate system is expressed by $x=(x, y, z)^T$, while the force and the moment that are externally applied to the robot are F and N respectively.

Figure 2:
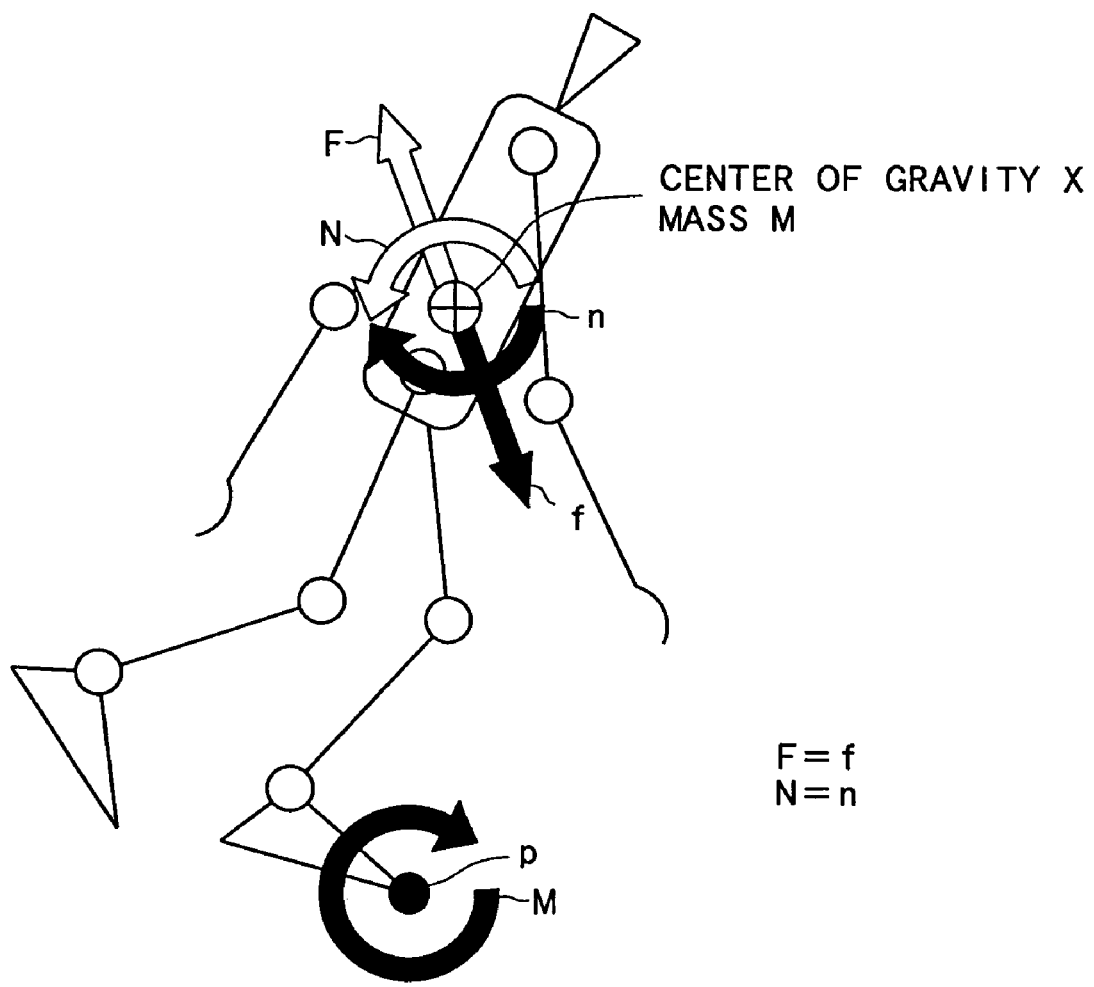
FIG. 2 is a schematic illustration of the constraining conditions (dynamic constraining conditions) imposed on the force f and the moment n that a motion pattern is about to generate so as to allow a combination of an external force F and an external moment N, where F=f and N=n.

A motion pattern that is prepared haphazardly for a robot would not operate properly according to a plan. In other words, a motion pattern that is prepared for a robot operates properly according to a plan only when the force $f=(f_x, f_y, f_z)^T$ and the moment $n=(n_x, n_y, n_z)^T$ that the motion pattern is going to generate are obtained as reaction from the actual environment. In other words, the motion pattern is required to impose constraining conditions to the force f and the moment n that the motion pattern is going to generate in such a way that a combination of an external force F and an external moment N, where F=f and N=n, may exist (see FIG. 2).

In this letter of specification, a constraining condition relating to such a dynamic equilibrium condition is referred to as "dynamic constraining condition". On the other hand, a constraining condition for explicitly constraining the position and the time such as those of a toe trajectory is referred to as "geometric constraining condition".

For example, it is known that the dynamic constraining condition of a robot when the robot is on a flat floor is equivalent to saying that "a ZMP is found within the floor touching polygon" (as described above). In other words, when an arbitrarily selected point $p=(p_x, p_y, p_z)^T$ is taken in the floor touching polygon of the inertia coordinate system and the moment that is generated around the point is $M=(M_x, M_y, M_z)^T$, a dynamic constraining condition is provided when the requirement of the following equation is met.

[Formula 1]

$$M_x = M_y = 0 \qquad (1)$$

The dynamic constraining condition expressed by the formula (1) above can be transformed to an expression using the force f and the moment n that a motion pattern is going to generate as will be described in greater detail hereinafter.

In a non-floor-touching state, on the other hand, since it is possible to obtain any external force and any external moment from the environment, the dynamic constraining conditions are defined by the two formulas shown below.

[Formulas 2]

$$f=0 \qquad (2)$$

$$n=0 \qquad (3)$$

In this embodiment, the control system of a legged mobile robot that can freely walk, run and jump is realized by preparing an algorithm adapted to compute a motion pattern for the entire body of the robot that meets the requirement of the above formula (1) for the floor-touching period and the requirements of the above formulas (2) and (3) for the non-floor-touching period on a real time basis. In this letter of specification, an example of operating the center of gravity of a robot to meet the requirements of the formulas (1) and (2) and also operating the base body (pelvis) of the robot to meet the requirement of the formula (3) will be described.

Figure 3:
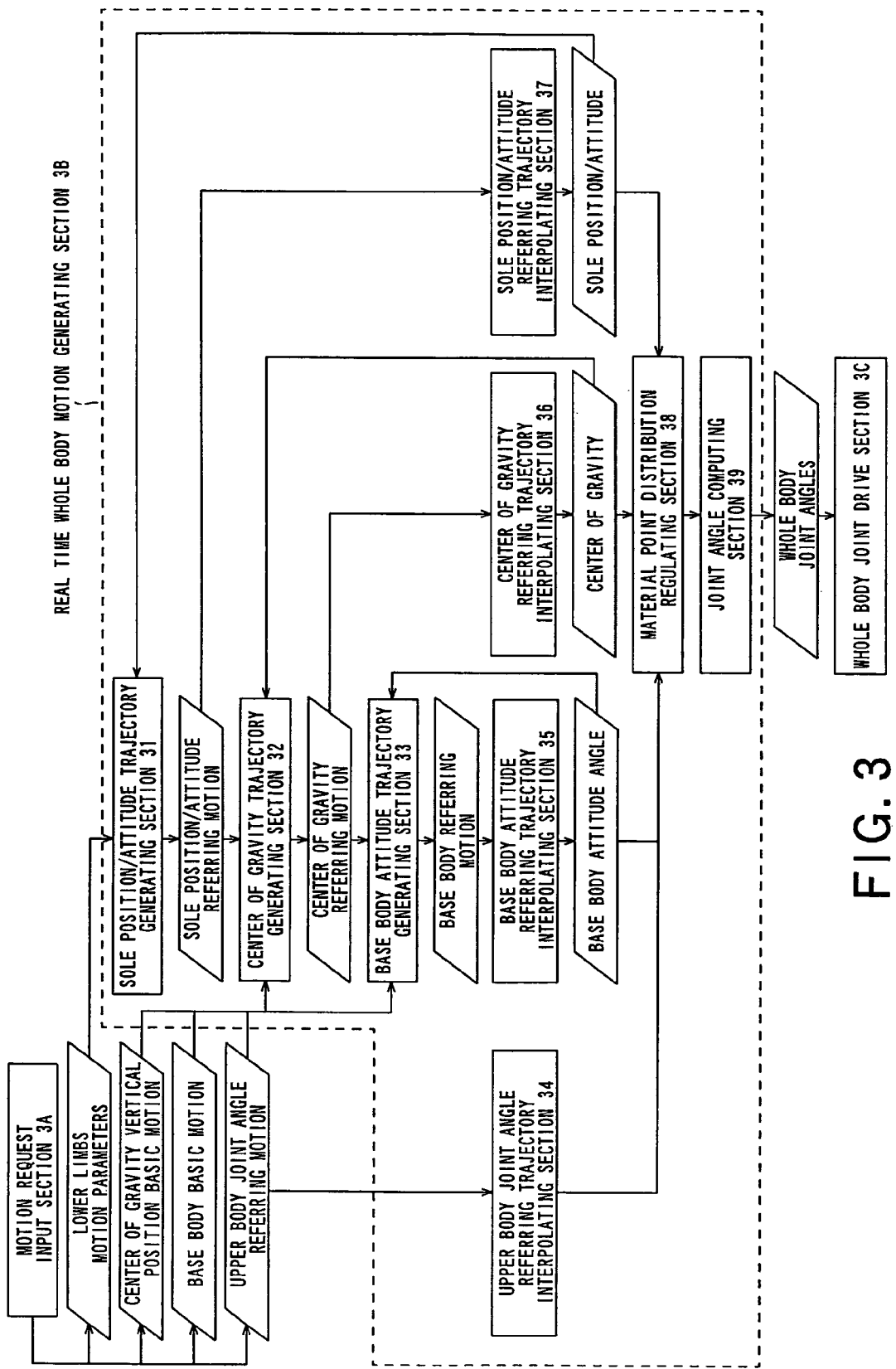
FIG. 3 is a schematic illustration of the functional features of the control system of an embodiment of legged mobile robot according to the invention.

FIG. 3 is a schematic illustration of the functional features of the control system of an embodiment of legged mobile robot according to the invention. As shown in FIG. 3, the control system comprises a motion request input section 3A, a real time whole body motion generating section 3B and a whole body joint drive section 3C. The real time whole body motion generating section 3B includes a sole position/attitude trajectory generating section 31, a center of gravity trajectory generating section 32, a base body attitude trajectory generating section 33, trajectory interpolating sections (an upper body joint angle referring trajectory interpolating section 34, a base body attitude referring trajectory interpolating section 35, a center of gravity referring trajectory interpolating section 36, a sole position/attitude referring trajectory interpolating section 37 to be more accurate), a material point distribution regulating section 38 and a joint angle computing section 39.

The motion request input section 3A is adapted to receive requests for motions of the upper body (arm joints, hip joints) (upper body joint angle referring trajectory) that are determined at every moment by a user program (or some other means (not shown)), requests for motions relating to the attitude angle of the base body (pelvis) is (base body attitude basic trajectory), requests for motions relating to the center of gravity vertical position trajectory (center of gravity vertical position basic trajectory) and parameters relating to motions of the lower limbs such as the stride, the motion cycle, the sluing angle, the airborne time and so on (lower limbs motion parameters) and outputs them to the real time whole body motion generating section 3B.

The real time whole body motion generating section 3B determines the state of movement of the robot at the next moment into which the robot can enter, maintaining the dynamic balance/equilibrium on the basis of the dynamic constraining conditions, and that can satisfy the requirements for changing the motions of the upper body and the lower limbs from the user program and outputs it as joint angle reference value for the whole body.

The whole body joint drive section 3C drives the actuators/motors that defines the degrees of freedom of the joints of the entire body by means of a servo controller (not shown) in order to realize the joint angle reference value output from the real time whole body motion generating section 3B.

The sole position/attitude trajectory generating section 31 of the real time whole body motion generating section 3B computes the positions and the attitude trajectories of the left and right soles for the next several steps from the positions and the attitudes of the soles at present on the basis of the parameter related to the motions of the lower limbs input from the motion request input section 3A.

The center of gravity trajectory generating section 32 computes the center of gravity trajectory that is smoothly linked to the current center of gravity trajectory and meets the requirement of the above formula (1) as dynamic constraining condition for the floor-touching period and the requirements of the above formula (2) as dynamic constraining conditions for the non-floor-touching period, while maximally reflecting the center of gravity vertical position basic trajectory input from the motion request input section 3A.

The base body attitude trajectory generating section 33 computes the base body angle trajectory that is smoothly linked to the current base body attitude trajectory and meets the requirement of the above formula (1) as dynamic constraining condition for the floor-touching period and the requirements of the above formula (2) as dynamic constraining conditions for the non-floor-touching period, while maximally reflecting the base body attitude basic trajectory input from the motion request input section 3A.

The trajectory interpolating sections (the upper body joint angle referring trajectory interpolating section 34, the base body attitude referring trajectory interpolating section 35, the center of gravity referring trajectory interpolating section lo 36, the sole position/attitude referring trajectory interpolating section 37) perform respective interpolating operations for the upper body joint angle referring trajectory, the base body attitude referring trajectory, the center of gravity referring trajectory and the sole position/attitude referring trajectory and computes respectively the upper body joint angles, the base body attitude angle, the center of gravity and the sole positions/attitudes. The material point distribution regulating section 38 regulates the distribution of the material points of the entire body so as to realize the upper body joint angles, the base body attitude angle, the center of gravity and the sole positions/attitudes simultaneously.

The joint angle computing section 39 determines the joint angles of the leg sections so as to realize the base body position and the sole positions/attitudes obtained for the next moment respectively by the material point distribution regulating section 38 and the sole position/attitude trajectory generating section 31. This can be done by way of known computations of inverse kinematics after determining their relative positions/attitudes.

Figure 4:
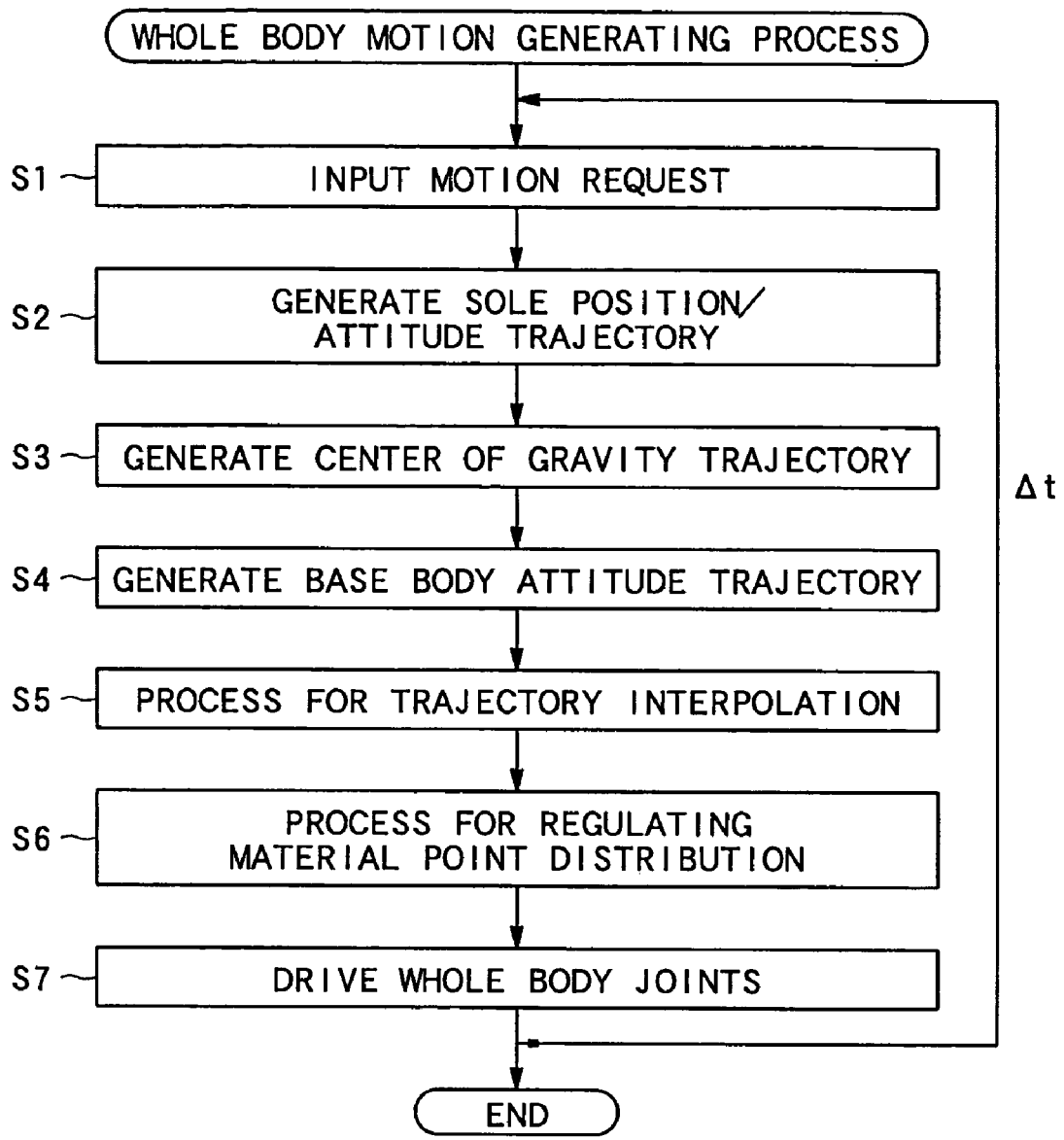
FIG. 4 is a flow chart illustrating the sequence of the processing operation that is carried out by the control system of FIG. 3.

FIG. 4 is a flow chart illustrating the sequence of the processing operation that is carried out by the control system of FIG. 3.

After the start of the processing operation, the control system inputs motion requests for the upper body joint angles, the base body attitude, the center of gravity vertical position and the lower limbs to the motion request input section 3A (Step S1).

Then, it generates a sole position/attitude trajectory, a center of gravity trajectory and a base body attitude trajectory respectively by means of the sole position/attitude trajectory generating section 31, the center of gravity trajectory generating section 32 and the base body attitude trajectory generating section 33 (Steps S2, S3, S4).

Thereafter, it computes the upper body joint angles, the base body attitude angle, the center of gravity position and the sole positions/attitudes for the next moment by the above described transfer interpolating sections (the upper body joint angle referring trajectory interpolating section 34, the base body attitude referring trajectory interpolating section 35, the center of gravity referring trajectory interpolating section 36, the sole position/attitude referring trajectory interpolating section 37) (Step S5).

Furthermore, it computes the joint angles of the entire body by means of the material point distribution regulating section 38 (Step S6) and finally drives the joints by means of the whole body joint drive section 3C and the servo controller (Step S7)

The processing operation of the control system illustrated in FIG. 3 is described above for a cycle. After completing the above described processing operation, the control system returns to Step S1 and repeats the above processing operation for each predetermined control cycle $\Delta t$ (e.g., in every 10 milliseconds).

This embodiment of legged mobile robot has a control system that allows the robot to walk, run and jump freely. When the robot performs motions such as running and jumping, there arises a problem that the load applied to each of the joints of the legs including the ankle joints is enormous at the moment when the supporting leg leaves the floor or when the idle leg touches the floor.

Generally, there is an idea of providing a robot with a buffering material or some other load absorption mechanism in order to alleviate an excessive load required to it. However, according to the concept of target ZMP follow-up control (as described above) that is in the mainstream of control method for bipedal robots, the soles of the robot are assumed to be formed by a rigid body and it is thought that the falling moment can be supported when a ZMP is found within the supporting polygon formed by the floor-touching points of the supporting leg and the floor. In other words, the use of a rigid body is desired for the soles. This contradicts the idea of providing the legs of a robot with a buffering material or some other load absorption mechanism.

Therefore, according to the invention, an idea of alleviating the load to which a leg is subjected to when it leaves or touches the floor in a running or jumping motion by controlling the sole at the front end of the leg. More specifically, leg motions including running and jumping are controlled on a real time basis by using three means of (1) defining the constraining conditions for the foot of the leg relative to the floor surface according to the degree of operability of the leg, (2) controlling the attitude of the sole as a function of the potential energy attributable to a minute quantity of positional changes of the joints of the leg and (3) controlling steps according to a modified ZMP trajectory. Each of the above listed means will be described below.

Defining the Constraining Conditions for the Foot of the Leg Relative to the Floor Surface According to the Degree of Operability of the Leg The relationship between the velocity of a robot at the center of gravity x and the angular velocity (minute velocity of the joint angle) of the joint angle $\theta$ of the robot is generally expressed locally linearly by the formula below, using a Jacobian matrix j.

[Formula 3]

$$\dot{x} = J\dot{\theta} \quad (4)$$

The attitude that makes any of the diagonal elements of the matrix $J^T J$ equal to 0 is referred to as "peculiar attitude" here. The angular velocity of the joint angle $\theta$ of the robot can be expressed by the formula below by transforming the formula (4) above. Note that $J^+$ is a pseudo-inverse matrix of the Jacobian matrix.

[formula 4]

$$\dot{\theta} = J^+ \dot{x} \quad (5)$$
$$= (J^T J)\dot{x}$$

From the above formula (5), it is clear that the angular velocity of the joint angle $\theta$ of the robot becomes infinite and the load applied to the joint is excessive when the robot approaches the peculiar attitude.

The degree of operability w can be used as an index for expressing the closeness of the attitude of the robot to the peculiar attitude. The degree of operability w is expressed by the formula below. Note that peculiar attitudes of robots and the degree of operability are described in the Robotics Society of Japan, "Robot Engineering" (Corona Publishing, pp. 247–248, 1990).

[Formula 5]

$$w = \sqrt{\det(J^T J)} \quad (6)$$

In the case of joint-type robot arms, peculiar attitudes are avoided generally by utilizing the redundancy of degrees of freedom. The redundancy can be discussed in terms of the constraining conditions of the foot that is going to touch the floor when the movable legs of a legged mobile robot are taken into consideration.

Figure 5:
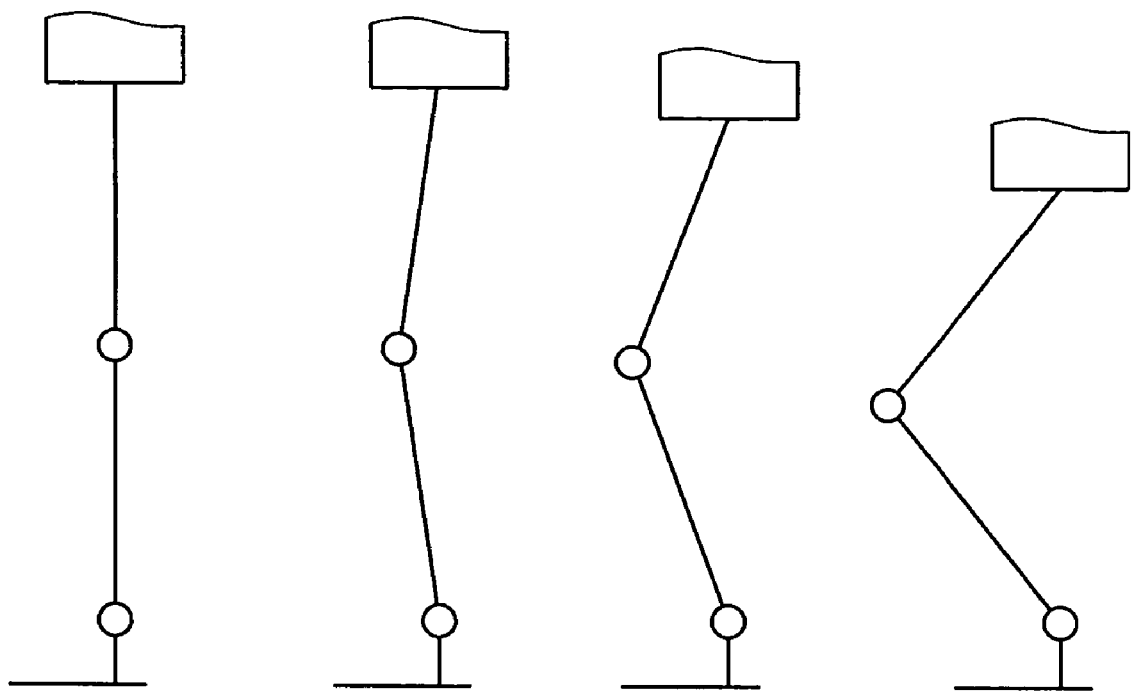
FIG. 5 is a schematic illustration of a peculiar attitude and the degree of operability of one of the legs of a robot.

FIG. 5 is a schematic illustration of a peculiar attitude and the degree of operability of one of the legs of a robot. The degree of operability is reduced when the leg is in a fully extended state, which corresponds to a peculiar attitude.

Therefore, the angular velocity of the joint angle $\theta$ of the robot is infinite and the loads applied to the joints of the leg are enormous. On the other hand, as the pitch axis of the leg and that of the ankle are bent and the leg leaves far from the peculiar attitude, the degree of operability is increased to reduce the angular velocity of the joint angle $\theta$ of the robot so that the loads applied to the joints are reduced.

Additionally, when a legged mobile robot is moving by means of the legs, e.g., walking, running or jumping and hence the movable legs repeatedly leave and touch the floor, the degree of operability changes depending on the floor touching condition of the sole at the moment when the leg leaves the floor (for jumping) or touches the floor (from jumping).

Figure 6:
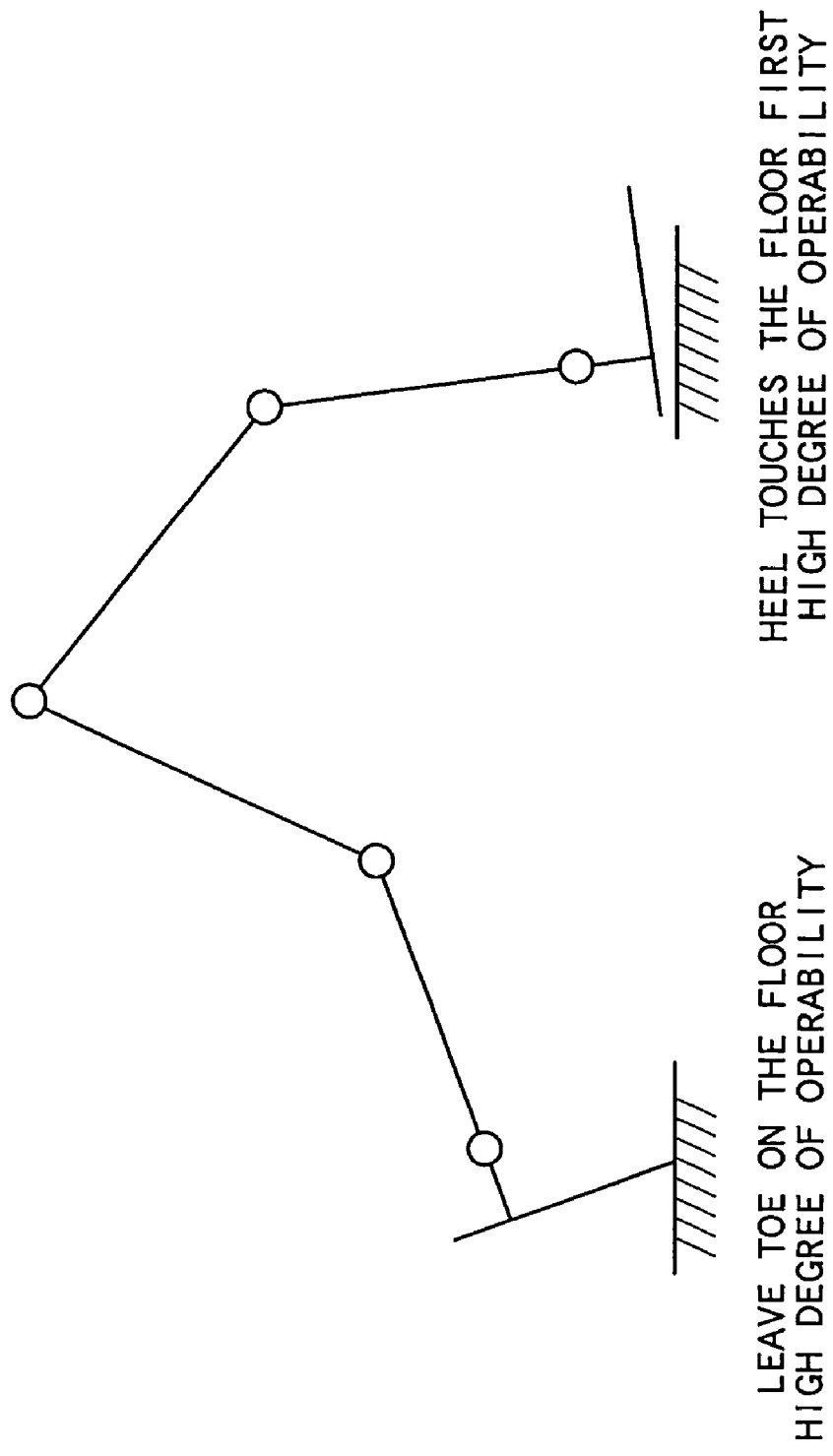
FIG. 6 is a schematic illustration of the attitudes of the left and right mobile legs when a legged mobile robot is performing a leg motion such as walking, running or jumping.

FIG. 6 is a schematic illustration of the attitudes of the left and right mobile legs when a legged mobile robot is performing a leg motion such as walking, running or jumping.

Firstly, consider the motion of the foot of the rear leg that is on the floor at the moment but going to leave the floor for advancing/jumping. Then, the leg leaves far from a peculiar attitude and hence the degree of operability increases when the entire sole of the foot does not leave the floor simultaneously but the toe is left on the floor so that consequently the loads to the joints are reduced. On the other hand, when the heel is left on the floor (not shown), the leg comes closer to a peculiar attitude so that the loads to the joints are increased.

Now, consider the motion of the foot of the fore idle leg that is moving forward and about to touch the floor. Then, the leg leaves far from a peculiar attitude and hence the degree of operability increases when the entire sole of the foot does not touch the floor simultaneously (so-called "flat sole") but the heel touches the floor first so that consequently the loads to the joints are reduced. On the other hand, when the toe touches the floor first (not shown), the leg comes closer to a peculiar attitude so that the loads to the joints are increased.

The motion of the foots of the legs of a legged mobile robot when the robot is moving, using the legs, e.g., running or jumping, is generated by the sole position/trajectory generating section 31. The sole position/trajectory generating section 31 reduces the loads to the joints by defining the constraining conditions of the foot of the leg that is leaving or touching the floor relative to the floor surface according to the degree of operability of the leg.

Figure 7:
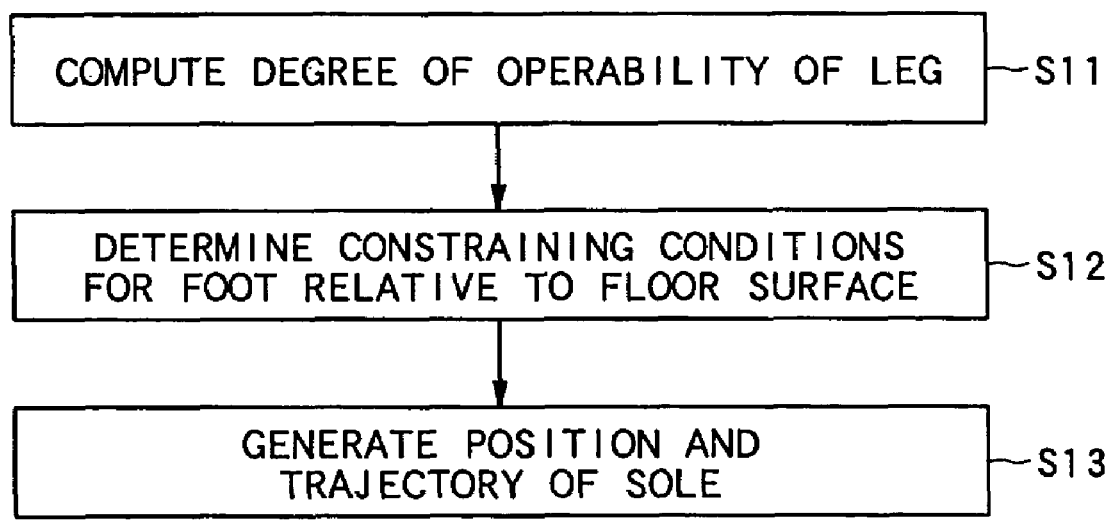
FIG. 7 is a flow chart illustrating the sequence of the processing operation that is carried out to define the constraining conditions of the foot section of a leg section when the foot section leaves or touches the floor according to the degree of operability of the leg section.

FIG. 7 is a flow chart illustrating the sequence of the processing operation that is carried out at this time. Firstly, the degree of operability of the leg when the foot leaves or touches the floor is computed (Step S11). Then, the constraining conditions of the foot relative to the floor surface are defined so as to maximize or increase the degree of operability when the robot moves (Step S12). The constraining conditions of the foot relative to the floor surface are expressed typically in terms of touching the floor at the heel, the toe or the entire sole. Then, the position and the trajectory of the sole are generated according to the constraining conditions (Step S13).

Figure 13:
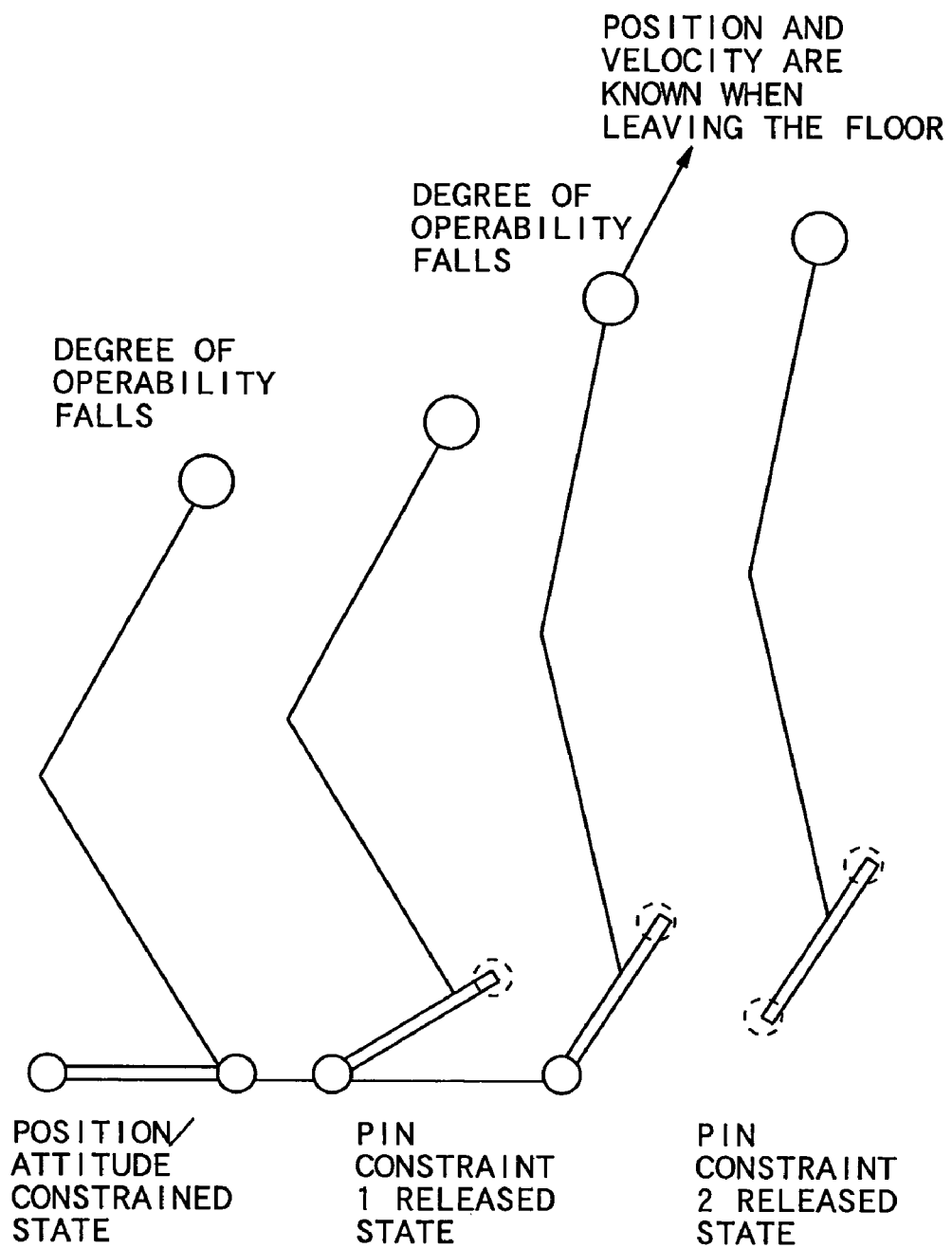
FIG. 13 is a schematic illustration of the relationship between the constraining conditions of a foot section relative to the floor surface and the degree of operability.

FIG. 13 is a schematic illustration of the relationship between the constraining conditions of a foot section relative to the floor surface and the degree of operability.

The degree of operability falls when the position/attitude are constrained, or when both the toe and the heel of the sole are constrained to the floor surface. A pin constraint 1 released state, where the heel is released first, is obtained as the leg motion proceeds. The degree of operability falls when leaving the floor because both the position and the velocity are known at this time. Thereafter, a pin constraint 2 released state is obtained as the toe is also released from the floor surface.

Controlling the Attitude of the Sole as a Function of the Potential Energy Attributable to a Minute Quantity of Positional Changes of the Joints of the Leg As pointed out above, when a legged mobile robot is performing a leg motion such as running or jumping, the constraining conditions of the foot of the leg that is going to leave or touch the floor are defined relative to the floor according to the degree of operability of the leg. As the constraining conditions of the foot relative to the floor surface are defined, the attitude of the foot (the angle between the sole and the floor surface) is determined so as to meet the requirements.

When determining the attitude of the foot, it is necessary to minimize the loads to the joints of the leg. For this purpose, then, it is necessary to determine the attitude of the foot so as to minimize the angular velocity of each of the joints. The expression that the angular velocity of each of the joints is minimized is equivalent to saying that the energy is minimal. Thus, in this embodiment, minimizing or reducing the potential energy attributable to a minute quantity of positional changes of the joints of the leg section is added to the norm besides the constraining conditions of the foot relative to the floor surface.

For example, when a constraining condition that the toe is left on the floor is defined and the position of the center of gravity of the robot is x while the angle of the toe (or the attitude of the sole) relative to the floor surface is θ (see FIG. 8), the relationship between the velocity of the robot at the center of gravity x and the angular velocity (minute velocity of the joint angle) of the joint angle θ of the robot is expressed locally linearly by the formula (4), using a Jacobian matrix, as described above. The potential energy of the joints of the leg is expressed by the formula below.

[formula 6]

$$\frac{1}{2}\Theta^T W \Theta = \sum_i \frac{1}{2} m_i \dot{\theta}_i^2 \quad (7)$$

The motion of the feet of a legged mobile robot is generated by the sole position/trajectory generating section 31 when the robot is using legs for running. jumping or some other leg motion. The sole position/trajectory generating section 31 defines the constraining conditions for the foot of the leg that is about to leave or touch the floor relative to the floor surface based on the degree of operability of the leg and subsequently determines the angle formed between the foot and the floor surface so as to minimize or reduce the potential energy that is attributable to a minute quantity of positional changes of the joints of the leg and reduce the loads to the joints.

Figure 9:
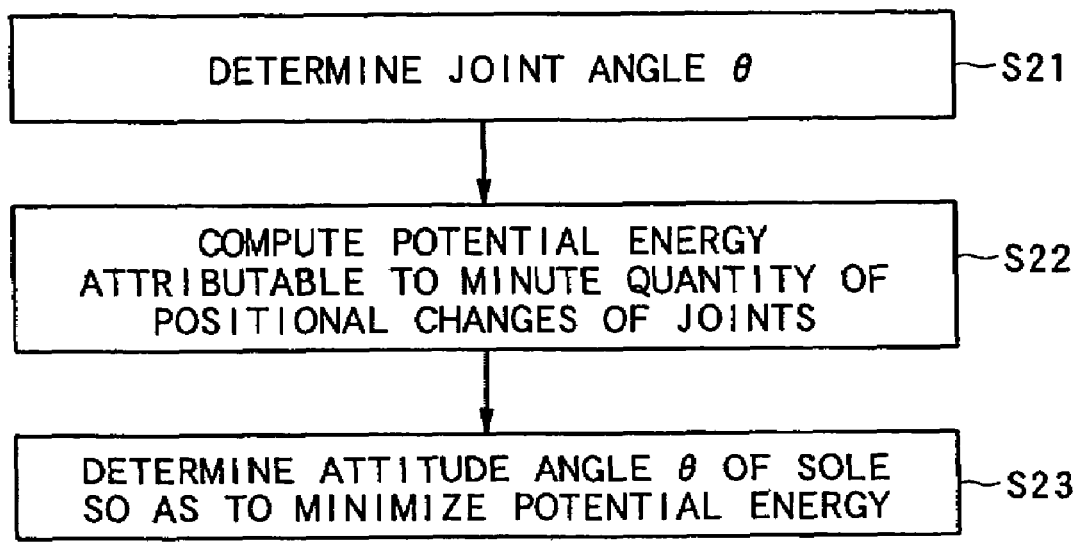
FIG. 9 is a flow chart illustrating the sequence of the processing operation that is carried out to control the angle between the sole and the floor surface according to the potential energy attributable to a minute quantity of positional changes of the joints of the leg section.

FIG. 9 is a flow chart illustrating the sequence of the processing operation that is carried out at this time. As the constraining conditions for the foot relative to the floor surface are defined, the angle θ of each of the joints of the leg is determined under these conditions (Step S21) and then the potential energy attributable to a minute quantity of positional changes of the joints of the leg is computed for performing a motion such as jumping or running (Step S22). Then, the angle s between the sole and the floor surface is determined so as to minimize or reduce the potential energy (Step S23).

Figure 8:
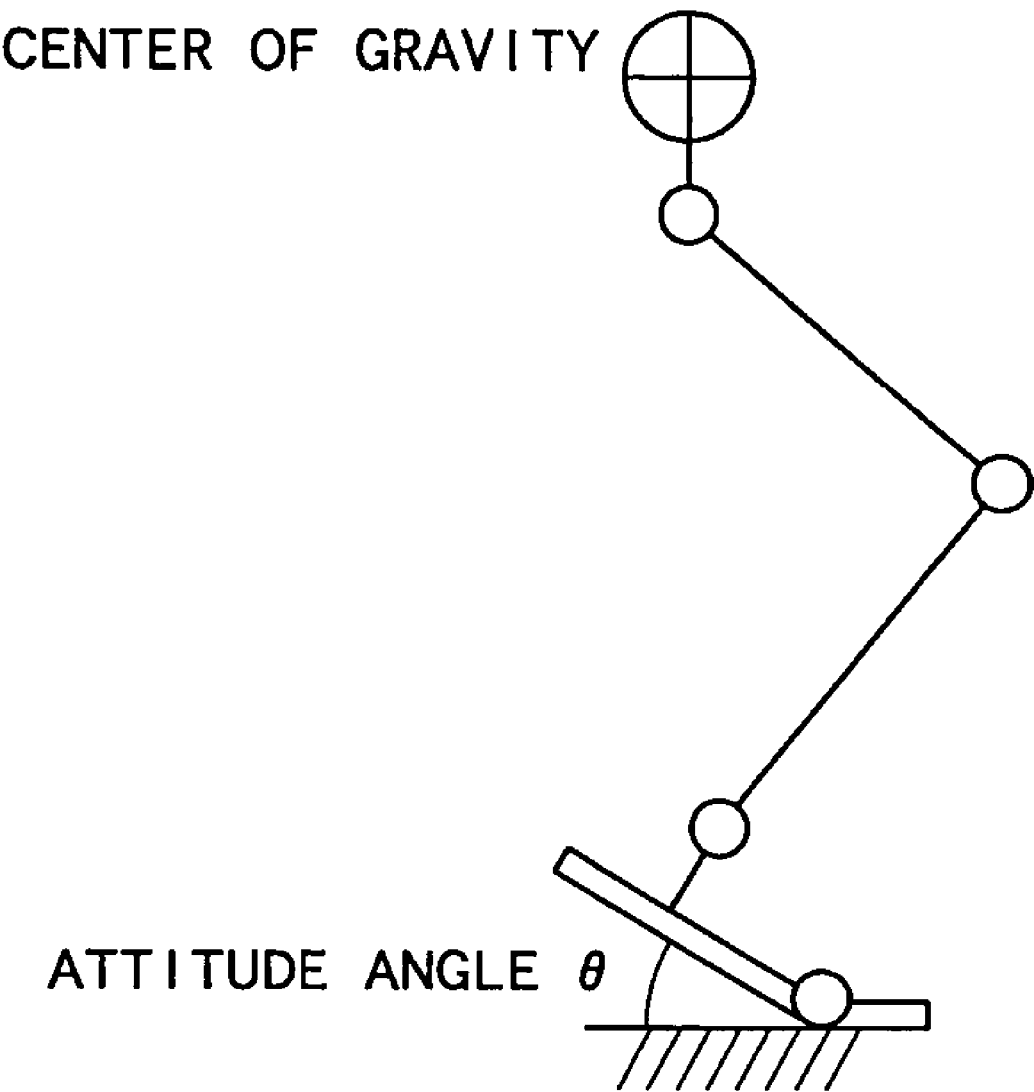
FIG. 8 is a schematic illustration of the relationship between one of the leg sections and the center of gravity of a robot when constraining conditions of leaving the toe on the floor are defined.

While the foot has a toe section that is rotatable relative to the sole in the instance of FIG. 8, the angle between the sole and the floor surface can be determined by following the sequence of FIG. 9 if the toe is integral with the sole. It may be needless to say that not only the toe but also the heel may be rotatable relative to the sole.

Figure 14:
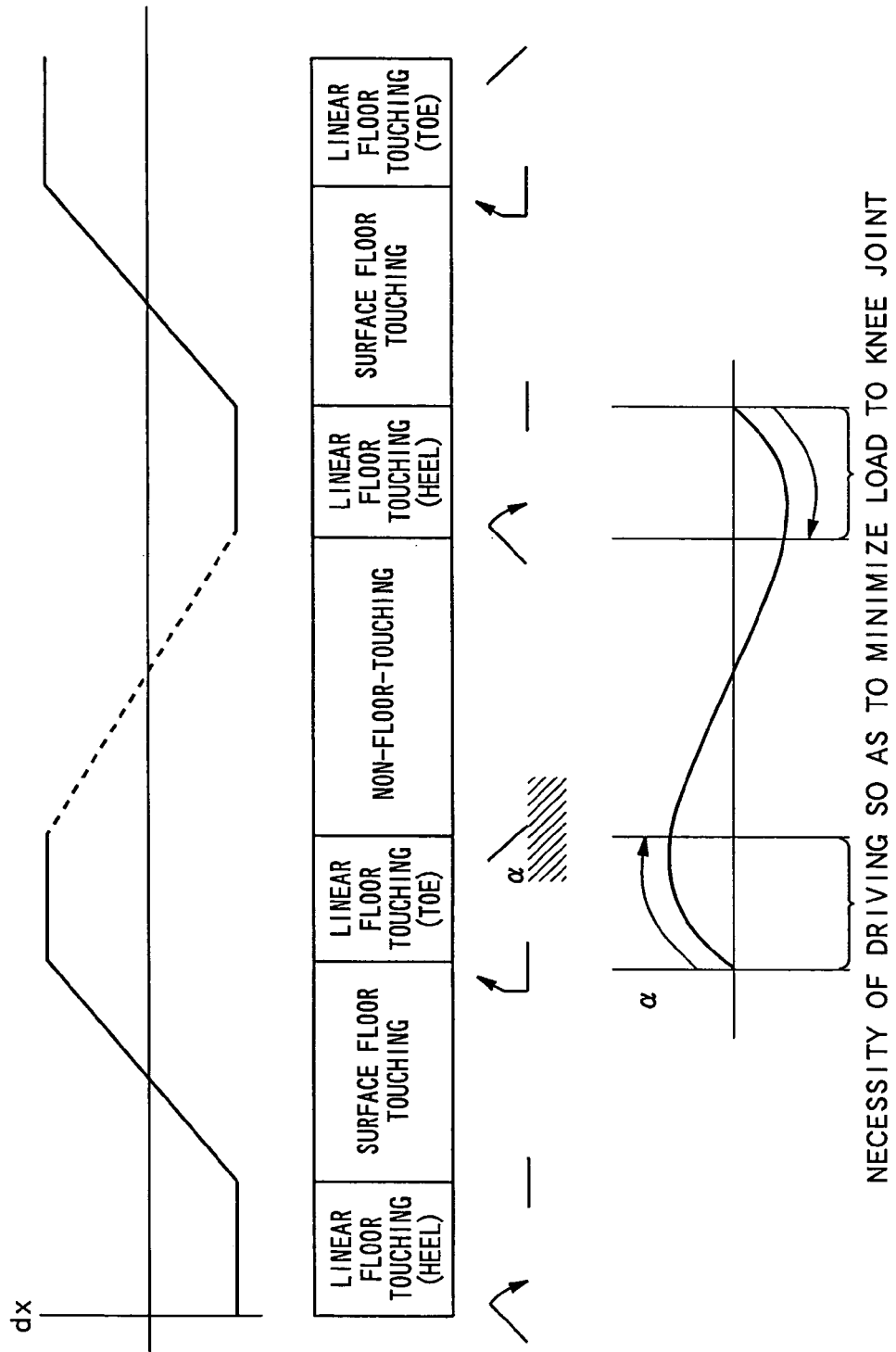
FIG. 14 is a schematic illustration of the sole attitude angle trajectory when a leg section repeats an operation of leaving a floor and then touching the floor.

FIG. 14 is a schematic illustration of the sole attitude angle trajectory when a leg section repeats an operation of leaving a floor and then touching the floor. In the illustrated instance, after the heel linearly touches the floor in the initial stages of the floor-touching motion, the entire sole surface touches the floor. Thereafter, the sequence is repeated. The lower half of FIG. 14 shows the sole attitude angle a at different moments.

The distance between the sole and the floor needs to be measured when the leg leaves the floor for the purpose of determining the constraining conditions for the foot relative to the floor surface, computing the degree of operability and determining the sole attitude angle trajectory. The data for the measured distance between the sole and the floor surface are effective when the airborne time is reduced due to an insufficient response of the actuators.

Figure 15:
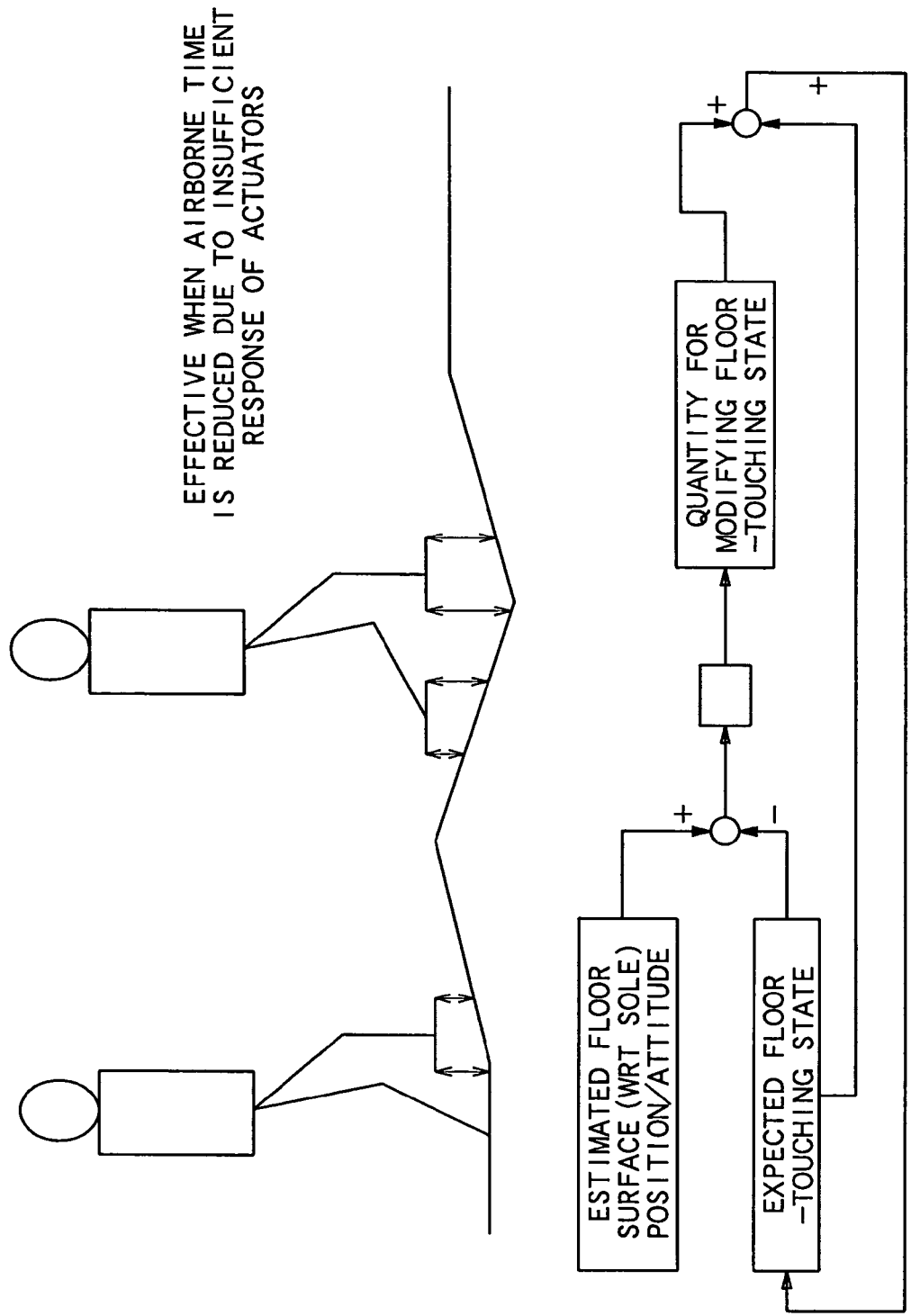
FIG. 15 is a schematic illustration of a distance measuring system for measuring the distance from a sole to a floor surface.

FIG. 15 is a schematic illustration of a distance measuring system for measuring the distance from a sole to a floor surface. After giving gain K to the is difference between the estimated value of the floor surface (sole) position/attitude and the expected floor-touching state, the obtained value is used as quantity for modifying the floor-touching state. Then, the sum of the quantity for modifying the floor-touching state and the expected floor-touching state is fed back to define the expected floor-touching state.

Controlling Steps According to a Modified ZMP Trajectory

Thus, the sole position/attitude trajectory generating section 31 determines the constraining conditions for the foot relative to the floor surface and the angle between the sole and the floor surface so as to minimize the potential energy attributable to a minute quantity of positional changes of the joints and computes the positions of the left and right soles from the current sole positions/attitudes to several steps ahead and the attitude trajectories. Subsequently, the center of gravity position trajectory generating section 32 computes the center of gravity trajectory that makes the dynamic constraining conditions hold true for the floor-touching period and for the non-floor-touching period.

As the constraining conditions for the foot relative to the floor surface and the angle between the sole and the floor surface are determined so as to maximize the degree of operability and minimize the potential energy attributable to a minute quantity of positional changes of the joints of the leg section as described above, the foot is made to take an attitude that reduces the area for touching the floor such as toe touching in order to reduce the loads to the joints.

Figure 10:
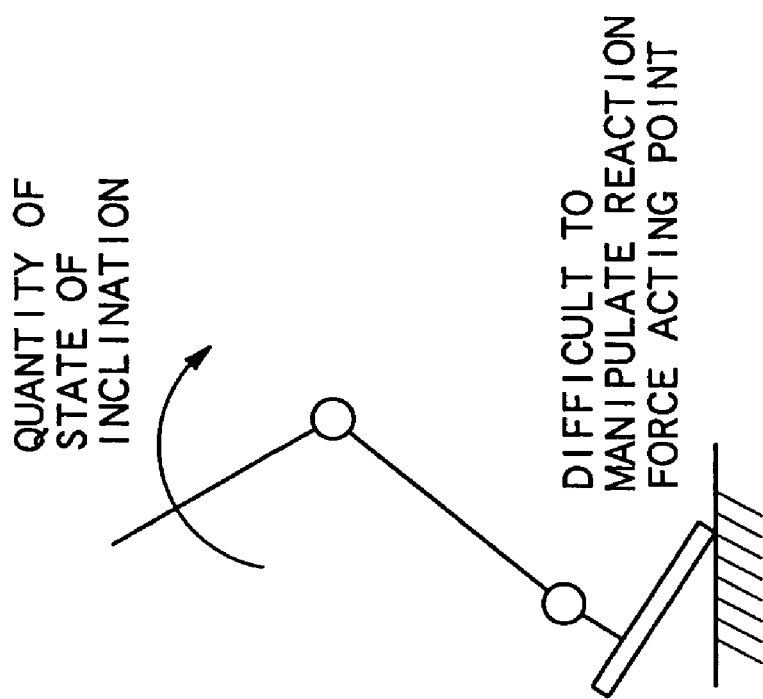
FIG. 10 is a schematic illustration of the relationship between the attitude of a sole and the attitude stability.
Figure 10:
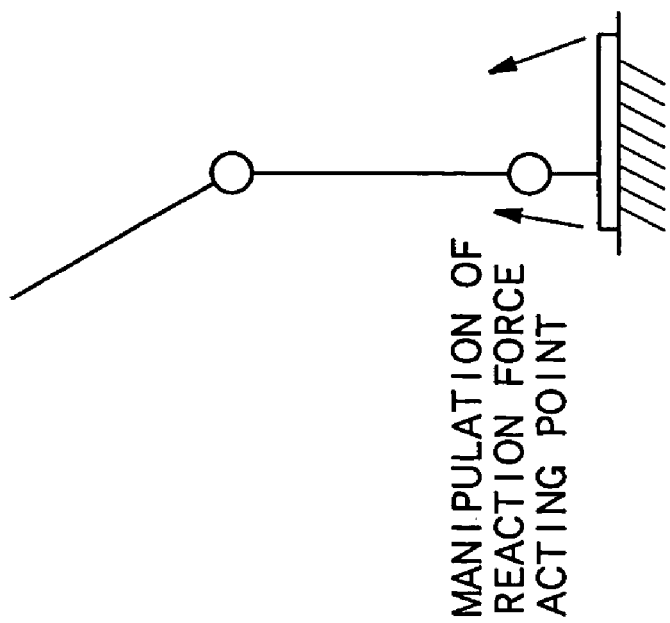

For attitude stability control using the ZMP norm, a ZMP trajectory is planned so as to make a ZMP to be found within the supporting polygon formed by the foot and the floor surface. When the leg touches the floor at the entire sole and the ZMP has a relatively large area, it is possible to maintain the attitude stability by manipulating the acting point of the reaction force of the floor by means of the entire supporting polygon. When, to the contrary, the leg touches the floor only at the toe (or at the heel), it is not possible to manipulate the acting point of the reaction force of the floor relative to the sole so that there may arise a problem that the stumbling attitude cannot be righted (see FIG. 10).

Therefore, in this embodiment, the quantity of inclination of the robot (distortion of the trajectory of the center of gravity) is observed during a leg motion such as running or jumping and a modified ZMP trajectory is computed so as to reduce the quantity of inclination. Then, the next step is determined according to the deviation of the modified ZMP trajectory from the original ZMP trajectory.

Figure 11:
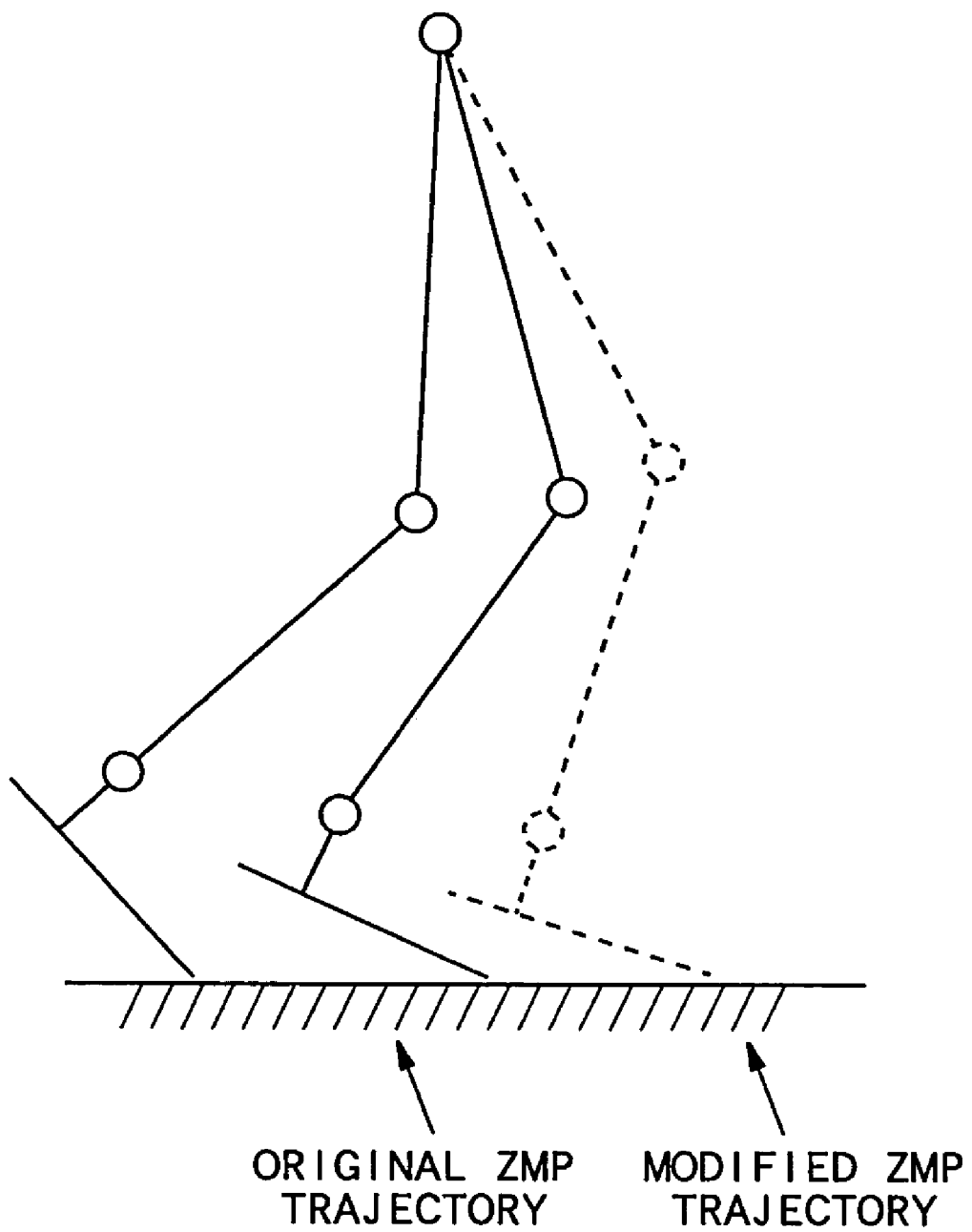
FIG. 11 is a schematic illustration of the operation of determining the next step according to the deviation of the modified ZMP trajectory from the original ZMP trajectory.

FIG. 11 is a schematic illustration of the operation of determining the next step according to the deviation of the modified ZMP trajectory from the original ZMP trajectory. In the illustrated instance, a ZMP trajectory is planned in advance as indicated by the solid lines. The rear leg is on the floor at the toe and it is not possible to right the attitude. Then, the quantity of inclination of the robot is observed and a modified ZMP trajectory is computed so as to reduce the quantity of inclination. Then, the next step is determined as shown in FIG. 11 according to the is deviation of the modified ZMP trajectory from the original ZMP trajectory.

Figure 12:
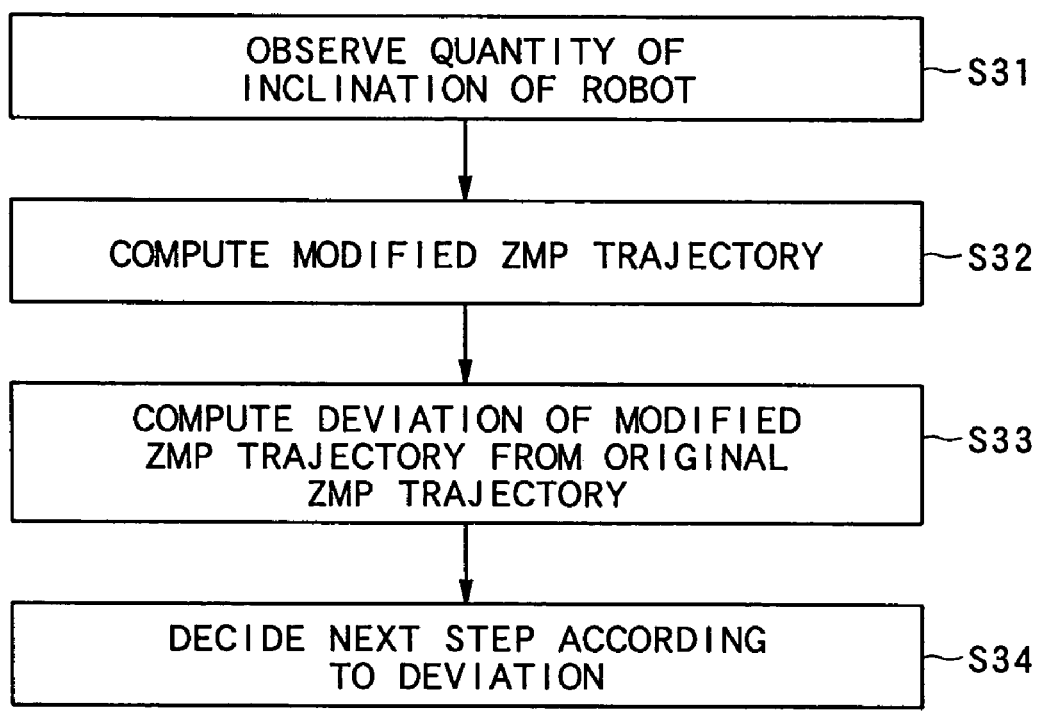
FIG. 12 is a flow chart illustrating the sequence of the processing operation that is carried out to determine the next step according to the deviation of the modified ZMP trajectory from the original ZMP trajectory.

FIG. 12 is a flow chart illustrating the sequence of the processing operation that is carried out to determine the next step according to the deviation of the modified ZMP trajectory from the original ZMP trajectory. When a robot is performing a leg motion such as running or jumping according to the ZMP trajectory that is planned in advance, the quantity of inclination of the robot is observed (Step S31). Then, a modified ZMP trajectory is computed so as to reduce the quantity of inclination (Step S32). Then, the deviation of the modified ZMP trajectory from the original ZMP trajectory is determined (Step S33). The next step (the stride and the floor touching position of the sole) is determined according to it (Step S34).

As the next step is determined according to the modified ZMP trajectory by the center of gravity position trajectory generating section 32, it is fed back to the sole position/attitude trajectory generating section 31. The sole position/attitude trajectory generating section 31 computes the positions and the attitude trajectories of the left and right soles for the next several steps on the basis of the positions and the attitudes of the soles at present.

The present invention is described above in detail by referring to specific embodiments. However, it may be clear to those skilled in the art that the embodiments can be modified or altered in various different ways without departing from the scope of the invention.

The present invention is not limited to products referred to as "robots". In other words, the present invention is applicable to mobile machines and other general devices that show motions resembling those of man by utilizing electric or magnetic effects if such products belong to industries other than the robot industry such as toys.

In short, the present invention is described here only by way of embodiments and the present invention is by no means limited to the description of the letter of specification. The present invention is defined only by the appended claims.

What is claimed is:

1. A robot having leg sections provided with soles and joint sections, the robot comprising:
   drive means for driving the leg sections;
   control means for controlling the drive means; and
   energy computing means for computing the potential energy attributable to a minute quantity of positional changes of the joint sections that arise when the robot moves by driving the leg sections;
   the control means being adapted to control the sole so as to minimize or reduce the potential energy.

2. The robot according to claim 1, wherein the control means controls the attitude angle between the sole and the floor touched by the sole so as to minimize or reduce the potential energy.

3. A method of controlling the motion of such a robot having leg sections provided with soles and joint sections, the method comprising:
   an energy computing step of computing the potential energy attributable to a minute quantity of positional changes of the joint sections that arise when the robot moves; and
   a drive control step of controlling the soles so as to minimize or reduce the potential energy.

4. The method according to claim 3, wherein the attitude angle between the sole and the floor touched by the sole is controlled so as to minimize or reduce the potential energy in the drive control step.

* * * * *